(12) United States Patent
Kopp et al.

(10) Patent No.: US 9,004,572 B2
(45) Date of Patent: Apr. 14, 2015

(54) ACTUATING DEVICE FOR AN ADJUSTABLE CONVERTIBLE TOP SYSTEM OF A MOTOR VEHICLE

(71) Applicant: Webasto-Edscha Cabrio GmbH, Stockdorf (DE)

(72) Inventors: Georg Kopp, Plattling (DE); Franz Haberl, Wallerfing (DE)

(73) Assignee: Webasto-Edscha Cabrio GmbH, Stockdorf (DE)

( * ) Notice: Subject to any disclaimer, the term of this patent is extended or adjusted under 35 U.S.C. 154(b) by 0 days.

(21) Appl. No.: 14/227,090

(22) Filed: Mar. 27, 2014

(65) Prior Publication Data

US 2014/0294615 A1    Oct. 2, 2014

(30) Foreign Application Priority Data

Mar. 28, 2013   (DE) .......................... 10 2013 103 217

(51) Int. Cl.
| | |
|---|---|
| *B60J 7/08* | (2006.01) |
| *F04B 25/00* | (2006.01) |
| *B60J 7/12* | (2006.01) |

(52) U.S. Cl.
CPC ............. *F04B 25/005* (2013.01); *B60J 7/1273* (2013.01)

(58) Field of Classification Search
CPC .............................. B60J 7/1273; F04B 25/005
USPC ................ 296/190.05, 107.01, 112, 115, 117
See application file for complete search history.

(56) References Cited

U.S. PATENT DOCUMENTS

| | | | |
|---|---|---|---|
| 6,299,233 B1 | 10/2001 | Mentink | |
| 6,736,443 B2 | 5/2004 | Holst et al. | |
| 6,832,806 B2 * | 12/2004 | Mentink et al. | ............... 296/115 |
| 7,900,992 B2 | 3/2011 | Roeder | |

FOREIGN PATENT DOCUMENTS

| | | |
|---|---|---|
| DE | 4123774 C2 | 7/1993 |
| DE | 19518071 A1 | 11/1996 |
| DE | 10219513 A1 | 1/2003 |
| DE | 10157818 C1 | 4/2003 |
| DE | 102006005001 A1 | 8/2007 |
| DE | 102008057880 A1 | 5/2010 |
| DE | 102009059652 A1 | 6/2011 |
| GB | 1183676 | 3/1970 |
| WO | 2007076768 A1 | 7/2007 |

* cited by examiner

*Primary Examiner* — Dennis H Pedder
(74) *Attorney, Agent, or Firm* — Quarles & Brady LLP

(57) ABSTRACT

An actuating device for an adjustable convertible top system of a motor vehicle includes at least two hydraulic drive cylinders. A first drive cylinder transmits an adjustment movement to a first gearing arrangement, and a second drive cylinder transmits the adjustment movement to a second gearing arrangement. The first drive cylinder and the second drive cylinder are connected hydraulically in series, such that an annular volume of the first drive cylinder is in fluid communication with a circular volume of the second drive cylinder via a connecting line. There is a difference between an annular area of the first drive cylinder forming the annular volume and a circular area of the second drive cylinder forming the circular volume. Intermediate gears having a different geometry and/or kinematics compensate for a speed difference between the two drive cylinders resulting from the difference.

12 Claims, 4 Drawing Sheets

ACTUATING DEVICE FOR AN ADJUSTABLE CONVERTIBLE TOP SYSTEM OF A MOTOR VEHICLE

CROSS REFERENCE TO RELATED APPLICATION

This application claims the priority benefit of German Patent Application No. 10 2013 103 217.6 filed on Mar. 28, 2013, which is fully incorporated herein by reference.

STATEMENT REGARDING FEDERALLY SPONSORED RESEARCH OR DEVELOPMENT

Not applicable.

FIELD OF THE INVENTION

The invention relates to an actuating device for an adjustable convertible top system of a motor vehicle.

BACKGROUND OF THE INVENTION

An actuating device of the type in question for a convertible top of a convertible is known from DE 195 18 071 A1. The actuating device described there is actuated hydraulically. The convertible top itself is fastened there on the left and right sides thereof to respective gearing arrangements which are composed of a multiplicity of links coupled mechanically to one another. The two gearing arrangements here have the task of mechanically guiding the convertible top during the adjustment between the closed position and the open position. For a satisfactory functioning of the convertible top, a synchronous running between the left gearing arrangement and the right gearing arrangement is imperative.

In order to drive the two gearing arrangements, DE 195 18 071 A1 describes two hydraulic drive cylinders which each act on one of the two gearing arrangements. This means, in other words, that the hydraulic adjustment of the two drive cylinders is transmitted via the extension and the retraction of the two piston rods to the gearing arrangements in order thereby to open or to close the convertible top. The two drive cylinders of the actuating device described in this document are connected into triangles. This means, in other words, that the annular volume of the first drive cylinder, the size of which is determined by the inside diameter of the drive cylinder and by the outside diameter of the piston rod, is hydraulically connected to the circular volume of the second drive cylinder, which is determined by the inside diameter of the drive cylinder, via a connecting line. Via said connecting line, the hydraulic drive fluid is pressed out of the annular volume of the first drive cylinder into the circular volume of the second drive cylinder, or, conversely, out of the circular volume of the second drive cylinder into the annular volume of the first drive cylinder. This hydraulic series connection has the advantage that the two drive cylinders can be hydraulically driven by the fact that the one drive cylinder is adjusted by a hydraulic drive device, for example a hydraulic pump. The adjustment movement of the one drive cylinder is then transmitted by displacement of the hydraulic drive fluid out of the annular volume of the first drive cylinder or out of the circular volume of the second drive cylinder to the drive cylinder downstream in each case via the connecting line. In this way, only one of the two drive cylinders has to be connected directly to the hydraulic drive source.

If the two drive cylinders are connected hydraulically in series, the drive fluid from the annular volume or from the circular volume of the upstream drive cylinder is transferred to the circular volume or annular volume of the downstream drive cylinder. The displaced volumetric flow from the upstream drive cylinder therefore corresponds to the pumped-in volume of the downstream drive cylinder. However, it should be noted here that, when the inside diameter of the drive cylinders is identical or when the outside diameter of the piston rods is identical, said constant volumetric flow between the two drive cylinders results in the two piston rods being extended at different speeds. This is because the annular volume of a drive cylinder is in each case smaller than the circular volume because of the diameter of the piston rod reaching through the annular volume. If, for example, a drive cylinder is then connected in series to a second drive cylinder in such a manner that the hydraulic oil flows out of the annular volume of the first drive cylinder into the circular volume of the second drive cylinder via the connecting line, then, when the drive cylinders are structurally identical in each case, the piston rod of the second drive cylinder is extended more slowly because of the difference in volume between the annular volume of the second drive cylinder and the circular volume of the first drive cylinder.

If, for a convertible top system, synchronous running between the first gearing arrangement and the second gearing arrangement is required, it is known from the prior art that the annular volume of the first drive cylinder and the circular volume of the second drive cylinder, said volumes each being connected hydraulically to each other via a connecting line, have to be suitably coordinated with each other. Said coordination consists in that the annular area of the first drive cylinder, said annular area forming the annular volume, and the circular area of the second drive cylinder, said circular area forming the circular volume, are precisely the same size. The effect achieved by said coordination in terms of area of the annular area of the first drive cylinder, which is produced from the difference between the internal cross section of the drive cylinder and the external cross section of the piston rod, and the circular area of the second drive cylinder, which is produced from the internal cross section of the second drive cylinder, is that the two drive cylinders can move synchronously with respect to each other despite the hydraulic series connection therebetween.

A disadvantage of this type of series connection, which is known from the prior art, of two drive cylinders of an adjustable convertible top system is that the choice of possible drive cylinders for realizing the convertible top system is considerably limited. This is because, when standard drive cylinders are used, it is customarily not possible to ensure, by choosing different constructional sizes for the two drive cylinders, that the annular area of the first drive cylinder will correspond to the circular area of the second drive cylinder. For the realization of adjustable convertible top systems with drive cylinders connected in series, the corresponding drive cylinders have therefore previously had to be produced as custom-manufactured articles corresponding to the required dimensioning. If, for example, the first drive cylinder was selected as a standard hydraulic cylinder, the second drive cylinder would have had to be precisely coordinated with the overall dimensions of the first drive cylinder, which was possible only by correspondingly expensive individual custom-manufactured articles.

SUMMARY OF THE INVENTION

Starting from this prior art, it is therefore the object of the present invention to propose a novel actuating device, in which the convertible top system permits the use of standard drive cylinders despite using drive cylinders which are connected in series.

The actuating device according to the invention is based on the principle that the annular area of the first drive cylinder and the circular area of the second drive cylinder, said circular area forming the circular volume, differ. By permitting said difference between the annular area of the first drive cylinder and the circular area of the second drive cylinder it is possible to dimension the drive cylinders substantially freely without, in the dimensioning of the drive cylinders, having to take a dependency between the circular area of the second drive cylinder and the annular area of the first drive cylinder into consideration. By means of the difference in area between the annular area of the first drive cylinder and the circular area of the second drive cylinder, a speed difference during the retraction and extension of the two drive cylinders is predetermined in a defined manner owing to the design on the basis of the series connection. However, this speed difference is predetermined systematically and is therefore controllable. This means, in other words, that the speed difference between the two series-connected drive cylinders is systematically predetermined and therefore does not change in the manner of a fault.

In order to compensate for the speed difference between the two series-connected drive cylinders and to realize the synchronism of the two gearing arrangements that is necessary for the actuation of the convertible top system, according to the invention a mechanical intermediate gear is provided in each case on the first gearing arrangement and/or on the second gearing arrangement. It is particularly preferred here for the intermediate gear to be connected between the gearing arrangements and the respectively associated driving cylinders. The two intermediate gears are configured here in terms of the geometry and kinematics thereof in such a manner that they are not identical. Instead, the geometry and/or kinematics of the intermediate gears are selected to differ in such a manner that the speed difference between the two drive cylinders is compensated for. Since the speed difference between the two drive cylinders is not caused by a fault, but rather is based on the design-induced system inequality thereof, this difference can easily and permanently be compensated for by interconnection of the two mechanical intermediate gears.

According to a first preferred embodiment, provision is made for the two drive cylinders of the actuating device to be of constructionally identical design. By means of the constructionally identical design of the drive cylinders, the number of necessary components is reduced, as a result of which costs can be saved. The mechanical intermediate gear provided according to the invention makes it possible for the speed difference caused by the series connection of the two structurally identical drive cylinders to be easily compensated for.

As an alterative to the use of structurally identical drive cylinders, provision is made for the inside diameter forming the circular area of the second drive cylinder to correspond to an integer value in the millimeter, centimeter or inch unit of measure. Such drive cylinders are referred to as standard drive cylinders, the internal cross section of which is graduated at regular intervals. The use according to the invention of intermediate gears in the actuating device makes it possible for the two drive cylinders to be designed as standard drive cylinders. The speed differences occurring here in the series connection are compensated for by the intermediate gears.

The geometry or kinematics of the two mechanical intermediate gears for compensating for the speed difference between the two drive cylinders is basically arbitrary. According to a preferred embodiment, the mechanical intermediate gears are designed in the manner of triangular links. Said triangular links are characterized by a disk-shaped component structure which is mounted in three rotary joints. The connecting line between the three rotary joints forms a respective triangle here. In order, according to the invention, to be able to compensate for the speed difference between the two drive cylinders, the two triangular links are in each case formed so as to differ in size. The two triangles of the two triangular links therefore differ in size. At the same time, provision is made for the two triangles to be similar to each other. Similarity in this context means that all of the intermediate angles of the two triangles at the two triangular links are chosen to be identical. Owing to this geometrical similarity (identity of the intermediate angles) and simultaneous size difference (the sides of the two triangles each differ in length), the effect is achieved that the two triangular links can compensate for the speed difference between the two drive cylinders.

In order to be able to transmit the adjustment movement to the associated gearing arrangement, a rotary joint of the triangular link should in each case be connected to the gearing arrangement. Furthermore, it is preferred if the adjustment movement of the associated drive cylinders is transmitted in each case at a rotary joint of the triangular links. Furthermore, a rotary joint of the triangular links should in each case be mounted in a fixed bearing, for example on the vehicle body.

The two drive cylinders should also be mounted, at one end in each case, preferably on a fixed bearing, for example on the vehicle body, in order to be suitably supported. The distance between the fixed bearing of the first drive cylinder and the fixed bearing of the associated first triangular link should coincide identically here with the distance between the fixed bearing of the second drive cylinder and the fixed bearing of the associated second triangular link.

After a certain operating time, a loss of the enclosed oil volume via the piston seals may occur at the two series-connected drive cylinders. Said leakage can be compensated for in the end positions of the pair of cylinders. For this purpose, a bypass line with a pressure control valve is provided between the circular volume of the second drive cylinder and the circular volume of the first drive cylinder. In order again to compensate for the leakage volume, the pair of cylinders can be moved into the end position and charged with a positive pressure, and therefore the leaked oil from the circular volume of the first drive cylinder is pressed via the bypass line into the circular volume of the second drive cylinder.

It is basically arbitrary which components of a convertible top system are adjusted with the actuating device according to the invention. In a preferred alternative, provision is made for the two gearing arrangements to drive the left and right sides of an adjustable folding convertible top, since a particularly high degree of synchronicity between the adjustment movements of the two gearing arrangements is necessary for the adjustable folding convertible tops.

Various embodiments of the invention are illustrated schematically in the drawings and are explained by way of example below.

DETAILED DESCRIPTION OF THE EXAMPLE EMBODIMENTS

Figure 1:
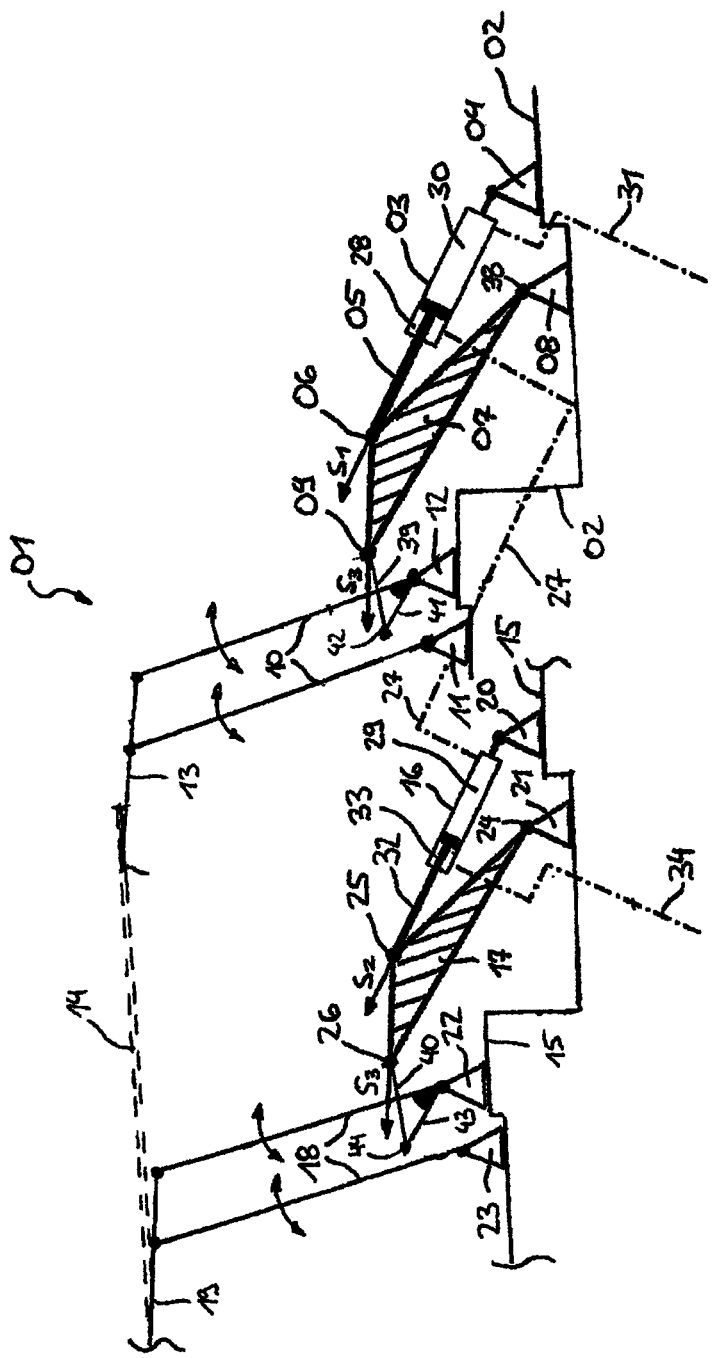
FIG. 1 shows an actuating device according to the invention for an adjustable convertible top system of a motor vehicle in a schematized, perspective view.

FIG. 1 shows an actuating device 01 for an adjustable convertible top system of a motor vehicle according to the teaching of the invention. FIG. 1 only contains the elements required for understanding the invention. A first drive cylinder 03 is mounted in a fixed bearing 04 on the right vehicle side 02. The piston rod 05 of the first drive cylinder 03 acts on a rotary joint 06 of a first triangular link 07. The triangular link 07, for its part, is mounted by a rotary joint 38 in a fixed bearing 08 of the right vehicle side 02. The adjustable end of the triangular link 07 is connected via a rotary joint 09 and a coupling rod 39 to a first gearing arrangement 10, namely to a four-bar linkage. For this purpose, the rear link rod of the four-bar linkage 10 has, at the lower end, a link extension 41 which protrudes in an angled manner, is connected rigidly to the link rod of the four-bar linkage 10 and can be driven by the coupling rod 39 via a rotary joint 42. The first gearing arrangement 10 is mounted here in fixed bearings 11 and 12 on the right vehicle side. A component 14 (merely illustrated schematically), for example a transverse strut, of an adjustable convertible top can be fastened by its right side to the upper link 13 of the gearing arrangement 10.

A second drive cylinder 16 which acts on a triangular link 17 and a gearing arrangement 18 arranged downstream is provided in the same manner on the left vehicle side 15. The gearing arrangement 18 is also designed as a four-bar linkage. The left side of the convertible top component 14 is fastened to the upper link 19 of the gearing arrangement 18. The fixed bearings 20, 21, 22 and 23 serve for mounting the drive cylinder 16, the triangular link 17 and the second gearing arrangement 18 on the left vehicle side. The second triangular link 17 is connected in the rotary joints 24 and 25 to the fixed bearing 21 and to the piston rod 32 of the second drive cylinder 16. A coupling rod 40 which acts on a link extension 43 at the lower end of the rear link in the gearing arrangement 18 is articulated in the rotary joint 26.

For the correct operation of the actuating device 01, it is absolutely imperative for the left side and the right side of the convertible top component 14 to be adjusted synchronously on both sides of the vehicle. This means, in other words, that a synchronous adjustment of the two gearing arrangements 10 and 18 has to be ensured. The two drive cylinders 03 and 16 are connected here in series by a connecting line 27. The connecting line 27 connects the annular volume 28 of the first drive cylinder 03 to the circular volume 29 of the second drive cylinder 16. During operation of the actuating device 01, the circular volume 30 of the first drive cylinder is charged via a pressure line 31 with hydraulic oil in order to extend the piston rod 05. Upon extension of the piston rod 05, the annular volume 28 is reduced and the hydraulic fluid contained in the annular volume 28 is pumped via the connecting line 27 into the circular volume 29 such that the piston rod 32 of the second drive cylinder 16 is extended. The hydraulic oil contained in the circular volume 33 of the second drive cylinder 16 is pumped back into the hydraulic circuit via a pressure line 34.

As a result, it can therefore be ascertained that the volumetric flow displaced in each case out of the annular volume 28 of the first drive cylinder 03 is of a constant size to the volumetric flow pumped into the circular volume 29 of the second drive cylinder 16. However, it therefore also is true that the annular area of the annular volume 28, which is produced from the difference of the inside diameter of the drive cylinder 03 and the outside diameter of the piston rod 05, multiplied by the extension speed is always exactly the same size as the product of the circular area of the circular volume 29, which is produced from the inside diameter of the second drive cylinder 16, and the extension speed of the second piston rod 32. The following formula therefore applies:

$$A_1(\text{ring}) * S_1 = A_2(\text{circle}) * S_2.$$

If this formula is rearranged, the ratio of the two extension speeds arises in accordance with the following formula:

$$S_2/S_1 = A_1(\text{ring})/A_2(\text{circle})$$

If a standard drive cylinder with a piston diameter of 22 mm and a piston rod diameter of 10 mm is now intended to be used as the first drive cylinder and at the same time a standard drive cylinder with a piston diameter of 20 mm is also intended to be used for the second drive cylinder 16, then, when the corresponding variables are used for the speed ratio $S_2$ to $S_1$, the following calculation arises:

$$S_2/S_1 = (22^2 - 10^2) * \pi/4 / 20^2 * \pi/4 = 0.96.$$

This means, in other words, that, owing to the series connection between the two drive cylinders 03 and 16 with the use at the same time of standard drive cylinders with integer values for the piston diameter and the piston rod diameter, there is a speed difference between the two piston rods 05 and 32 of 0.96. That is to say, the extension speed or retraction speed of the piston rod 32 amounts only to 96% of the piston rod 05.

In order to compensate for the system-induced speed difference between the two drive cylinders 03 and 16, the two triangular links 07 and 17 are in each case connected between the drive cylinders 03 and 16, on the one hand, and the two respectively assigned gearing arrangements 10 and 18, on the other hand, as part of an intermediate gear. The two triangular links 07 and 17 are designed here in terms of the geometry thereof as similar triangles, but with a difference in size of 4% between the two triangular links. That is to say, in other words, that the lengths of the three sides of the triangular link 17 are in each case 4% shorter than the corresponding sides of the triangular link 07. This geometry ensures that the two rotary joints 09 and 26, which are respectively fastened via the coupling rods 39 and 40 to the two gearing arrangements 10 and 18, are moved at a synchronized speed, that is to say without a speed difference. The desired synchronous running of the two gearing arrangements 10 and 18 is therefore realized by the triangular links 07 and 17 used in the intermediate gear. The distance between the fixed links 04 and 08, on the one hand, and the two fixed links 20 and 21, on the other hand, is exactly the same size here.

Figure 2:
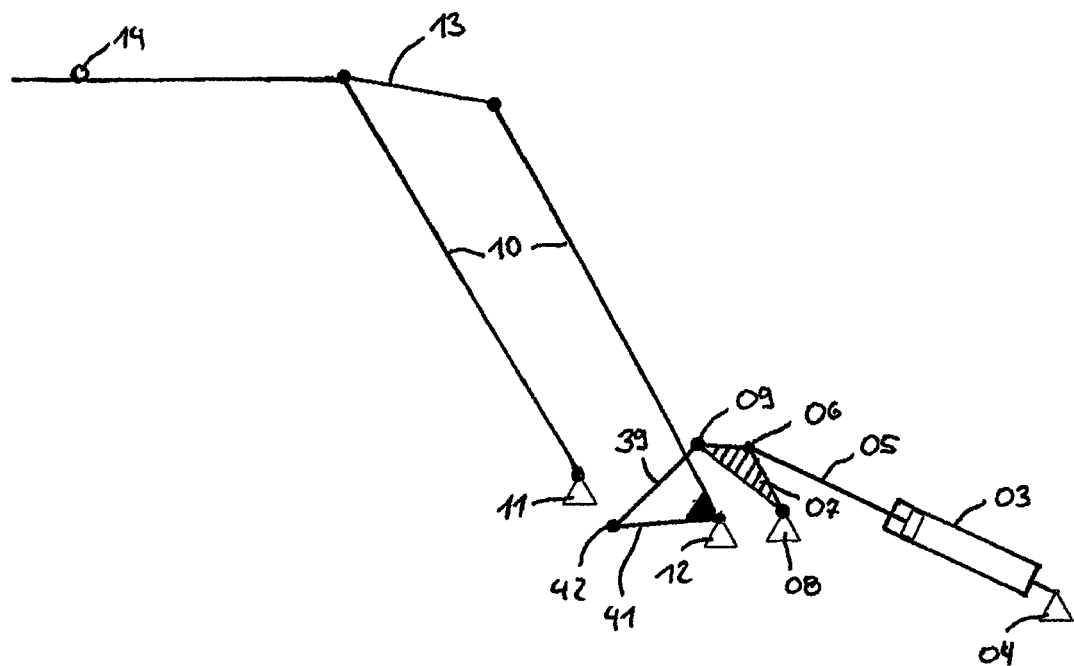
FIG. 2 shows the right side of the actuating device according to FIG. 1 in the extended state.

FIG. 2 shows the right side of the actuating device 01 in the extended state. The size ratios of the triangular link 07, the coupling rod 39 and the gearing arrangement 10 with the link extension 41 relative to one another are slightly changed in relation to the illustration in FIG. 1 in order to be able better to see the function of the individual parts.

Figure 3:
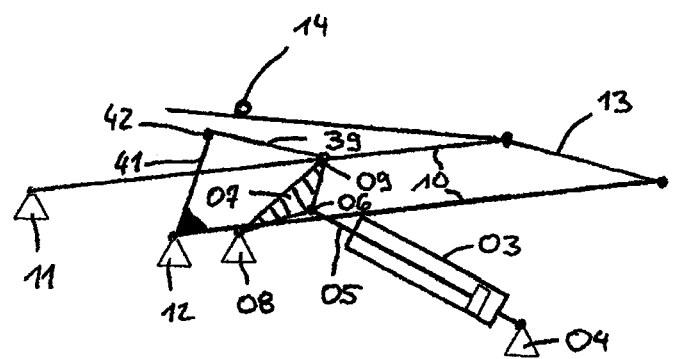
FIG. 3 shows the actuating device according to FIG. 2 in the retracted state.

FIG. 3 shows the right side of the actuating device 01 in the retracted state. In an overall view of FIG. 2 and FIG. 3, the movement kinematics of the actuating device 01 during the opening and closing of a convertible top system can be seen.

Figure 4:
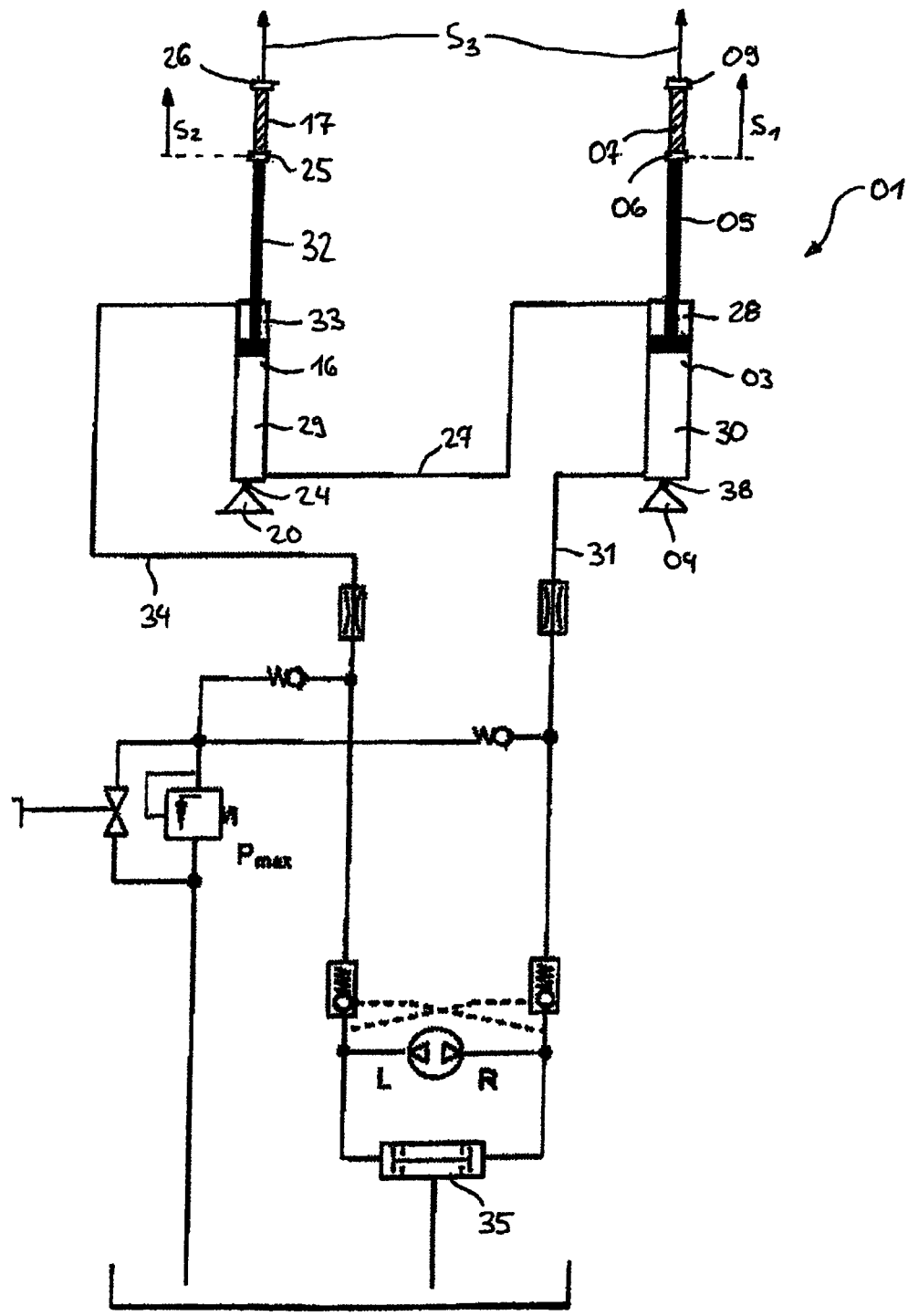
FIG. 4 shows the hydraulic construction of the actuating device according to FIG. 1 as a schematized block diagram.

FIG. 4 shows the hydraulic block diagram of the actuating device 01 in a schematized view. The two drive cylinders 03 and 16 are connected via lines 31 and 34 to a hydraulic oil circuit into which the hydraulic oil can be pumped by means of a hydraulic pump 35. The annular volume 28 of the first drive cylinder 03 is connected via the connecting line 27 to the circular volume 29 of the second drive cylinder 16. The two piston rods 05 and 32 act on the two gearing arrangements 10 and 18 via the triangular links 07 and 17. Owing to the series connection of the two drive cylinders 03 and 16, the two rotary joints 06 and 25 are extended and retracted at different speeds S1 and S2. The ratio between S1 and S2 here is 96%. This means, in other words, that, during the operation of the actuating device 01, the rotary joint 25 is extended or retracted 4% slower than the rotary joint 06. By means of the kinematics and geometry of the triangular links 07 and 17, said speed difference is compensated for, and therefore the two rotary joints 09 and 26 are extended synchronously to each other at the identical speed S3 in order to be able to move the convertible top component 14 synchronously.

Figure 5:
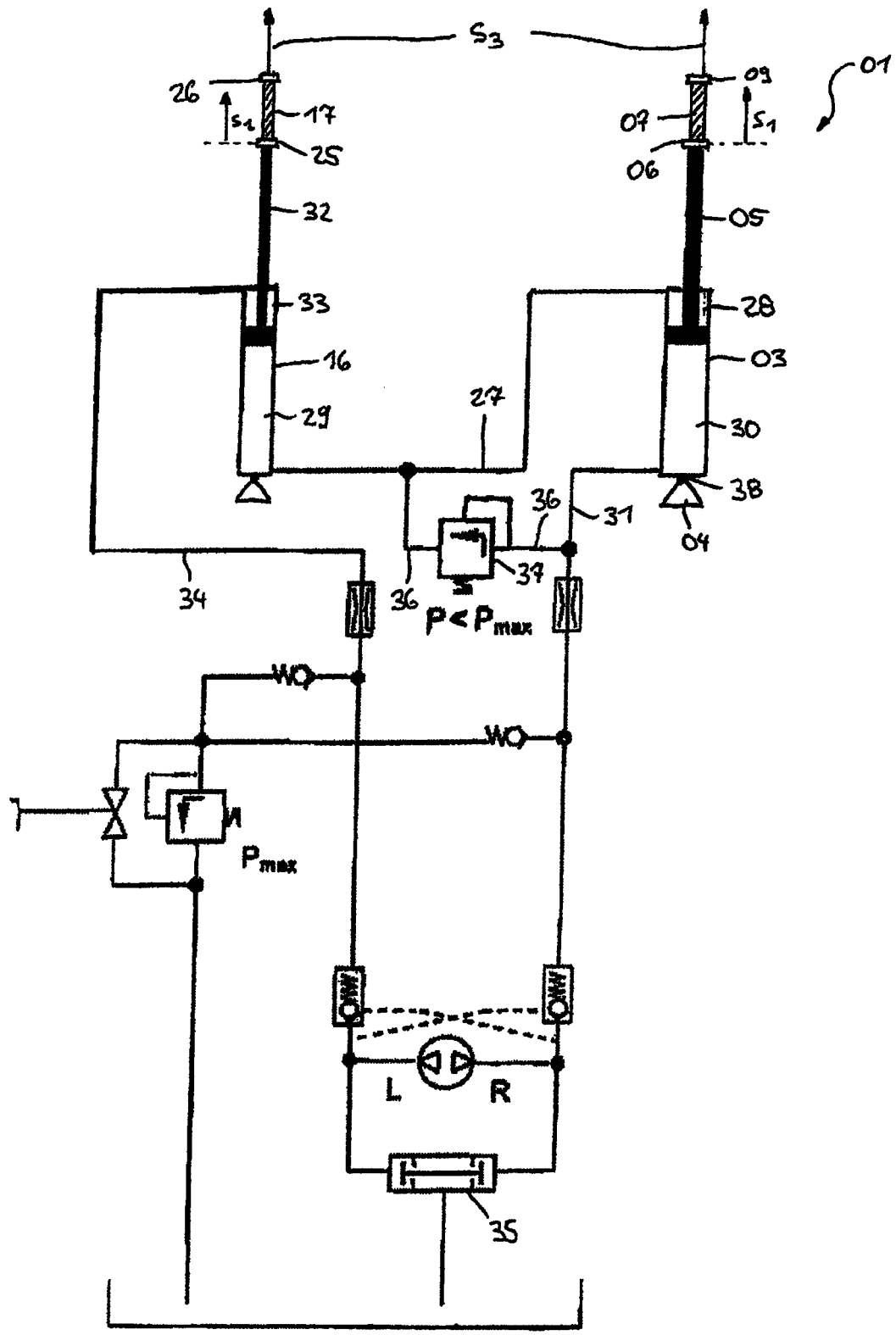
FIG. 5 shows the block diagram according to FIG. 2 expanded by a bypass line for compensating for leakage.

FIG. 5 shows the block diagram according to FIG. 2 expanded by a bypass line 36 which produces a direct connection between the circular volume 30 of the first drive cylinder 03 and the circular volume 29 of the second drive cylinder 16. If, because of the operation of the actuating device 01, leaked oil from the circular volume 30 has been displaced past the piston seal into the annular volume 28, there is too large an amount of oil in the liquid reservoir formed from the annular volume 28 and the circular volume 29. In order to return said leaked oil, the circular volume 33 of the second drive cylinder 16 can be charged with positive pressure. Said positive pressure first of all has the effect that the piston rod 32 is moved into the end position thereof, with, first of all, a residual volume remaining between the piston of the drive cylinder 16 and the basic area of the drive cylinder 16, said residual volume corresponding to the volume of the leaked oil. In the event of a sufficient increase in the pressure volume in the circular volume 33, said leaked oil is then pressed by the bypass line 36 past the pressure control valve 37 back into the line 31 until the piston of the drive cylinder 16 has completely displaced the leaked oil out of the circular volume 29.

The invention claimed is:

1. An actuating device for an adjustable convertible top system of a motor vehicle, said device comprising:
   a first hydraulic drive cylinder having an annular area defining in part an annular volume and transmitting an adjustment movement to a first gearing arrangement;
   a second hydraulic drive cylinder having a circular area defining in part a circular volume and transmitting the adjustment movement to a second gearing arrangement, the first drive cylinder and the second drive cylinder being connected hydraulically in series, and therefore the annular volume of the first drive cylinder and the circular volume of the second drive cylinder are hydraulically connected to each other via a connecting line, wherein there is a difference between the annular area of the first drive cylinder, said annular area forming the annular volume, and a circular area of the second drive cylinder, said circular area forming the circular volume, and, during the adjustment of the convertible top system, the first and second drive cylinders being extended and retracted with a defined speed difference owing to the difference between the annular area of the first drive cylinder and the circular area of the second drive cylinder;
   a first intermediate gear interacting with the first gearing arrangement; and
   a second intermediate gear interacting with the second gearing arrangement, the first intermediate gear having at least one of a different geometry and kinematics compared to said second intermediate gear compensating for a speed difference between the first and second drive cylinders to maintain a synchronous running of the first gearing arrangement and of the second gearing arrangement.

2. The actuating device as claimed in claim 1, wherein the two drive cylinders are of constructionally identical design.

3. The actuating device as claimed in claim 1, wherein an inside diameter forming the circular volume of the second drive cylinder corresponds to an integer value in at least one of a millimeter, centimeter and inch unit of measure.

4. The actuating device as claimed in claim 1, wherein the two mechanical intermediate gears each comprise a triangular link which are mounted in in each case three rotary joints, the connecting lines between the three rotary joints of the two triangular links each forming a triangle, and the two triangles of the triangular links differing in size, and the two triangles of the triangular links being similar to each other and having identical intermediate angles, and the size difference between the two triangular links compensating for the speed difference between the two drive cylinders.

5. The actuating device as claimed in claim 4, wherein the adjustment movement of the triangular links is transmitted in each case to the respectively assigned gearing arrangements at a rotary joint of the triangular links.

6. The actuating device as claimed in claim 5, wherein the rotary joint of the triangular links acts on the respectively assigned gearing arrangements via a coupling rod.

7. The actuating device as claimed in claim 6, wherein the coupling rod acts on a link extension of the respectively assigned gearing arrangement via a rotary joint.

8. The actuating device as claimed in claim 4, wherein the adjustment movement of the associated drive cylinders is transmitted in each case at a rotary joint of the triangular links.

9. The actuating device as claimed in claim 4, wherein a rotary joint of the triangular links is mounted in each case in a fixed bearing.

10. The actuating device as claimed in claim 4, wherein one end of the two drive cylinders is in each case mounted rotatably in a fixed bearing, wherein the distance between the fixed bearing of the first drive cylinder and the fixed bearing of the associated first triangular link identically corresponds to the distance between the fixed bearing of the second drive cylinder and the fixed bearing of the associated second triangular link.

11. The actuating device as claimed in claim 1, wherein a bypass line with a pressure control valve is provided between the circular volume of the second drive cylinder and the circular volume of the first drive cylinder, it being possible, when a predetermined positive pressure is exceeded, for the hydraulic drive fluid, bypassing the annular volume of the first drive cylinder, to flow directly between the circular volumes of the two drive cylinders.

12. The actuating device as claimed in claim 1, wherein the two gearing arrangements drive left and right sides of a convertible top component in an adjustable convertible top system.

* * * * *